(12) United States Patent
Naito et al.

(10) Patent No.: US 11,954,664 B2
(45) Date of Patent: Apr. 9, 2024

(54) READING DEVICE AND METHOD

(71) Applicant: TOSHIBA TEC KABUSHIKI KAISHA, Tokyo (JP)

(72) Inventors: Hidehiro Naito, Mishima Shizuoka (JP); Kiyomi Horii, Izu Shizuoka (JP); Hitoshi Iizaka, Fuji Shizuoka (JP); Hidemi Mihara, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 219 days.

(21) Appl. No.: 17/361,704

(22) Filed: Jun. 29, 2021

(65) Prior Publication Data

US 2021/0326829 A1 Oct. 21, 2021

Related U.S. Application Data

(63) Continuation of application No. 16/291,578, filed on Mar. 4, 2019, now abandoned.

(30) Foreign Application Priority Data

Mar. 5, 2018 (JP) .................................. 2018-038888

(51) Int. Cl.
  *G06Q 20/20* (2012.01)
  *G06K 7/14* (2006.01)
  *G07G 1/00* (2006.01)

(52) U.S. Cl.
  CPC ......... *G06Q 20/209* (2013.01); *G06K 7/1413* (2013.01); *G06Q 20/208* (2013.01); *G07G 1/0063* (2013.01)

(58) Field of Classification Search
  CPC .. G06Q 20/209; G06Q 20/208; G06K 7/1413; G07G 1/0063
  See application file for complete search history.

(56) References Cited

U.S. PATENT DOCUMENTS 6,290,131 B1  9/2001  Kolis et al.
6,330,973 B1  12/2001  Bridgelall et al.
(Continued)

FOREIGN PATENT DOCUMENTS

EP  3185225 A1  6/2017
JP  H06187475 A  7/1994
(Continued)

OTHER PUBLICATIONS

Extended European Search Report dated May 17, 2019, mailed in counterpart European Application No. 19160706.8, 7 pages.

*Primary Examiner* — Paul Danneman
(74) *Attorney, Agent, or Firm* — Kim & Stewart LLP

(57) ABSTRACT

According to one embodiment, a reading device includes a communication interface for communication with a commodity registration device. A commodity reader of the reading device reads commodity information from a commodity and the commodity information can be used for identifying the commodity. An output device signals that the commodity reader has read commodity information. A controller causes the communication interface to transmit the commodity information read by commodity reader, initialize the communication interface when it is determined that transmission of the commodity information has failed, and signal a communication failure when transmission of the commodity information has failed.

20 Claims, 7 Drawing Sheets

(56) References Cited

U.S. PATENT DOCUMENTS

| | | | |
|---|---|---|---|
| 7,232,063 B2* | 6/2007 | Fandel | .................... G07G 1/14 |
| | | | 235/383 |
| 2007/0040024 A1 | 2/2007 | Murofushi et al. | |
| 2012/0321146 A1* | 12/2012 | Kundu | ................. G06Q 20/208 |
| | | | 340/568.8 |
| 2016/0351023 A1 | 12/2016 | Takeno et al. | |
| 2017/0178464 A1 | 6/2017 | Haketa | |

FOREIGN PATENT DOCUMENTS

| | | |
|---|---|---|
| JP | H08107437 A | 4/1996 |
| JP | H08320907 A | 12/1996 |
| JP | 2016224734 A | 12/2016 |

\* cited by examiner

US 11,954,664 B2

READING DEVICE AND METHOD

CROSS-REFERENCE TO RELATED APPLICATIONS

This application is a continuation of U.S. patent application Ser. No. 16/291,578, filed on Mar. 4, 2019, which is based upon and claims the benefit of priority from Japanese Patent Application No. 2018-038888, filed on Mar. 5, 2018, the entire contents of each of which are incorporated herein by reference.

FIELD

Embodiments described herein relate generally to a reading device and a method.

BACKGROUND

In the related art, in a retail store such as a supermarket, a commodity registration device is used for registration of commodities to be sold in a sales transaction. The commodity registration device is provided with a reading device that reads commodity information from the commodity to be sold.

When commodity information is read, the commodity registration device outputs a sound ("a reading sound") notifying that the commodity information has been read. Here, if the reading device has problem with communication, the commodity registration device may not receive the commodity information from the reading device and the commodity information might not be registered as a commodity in the sales transaction.

However, since the reading device outputs the reading sound, the store clerk or other operator assumes that the commodity has been registered, and omission of the commodity registration from the sales transaction may occur. In response to such a problem, there is a possible method of outputting the reading sound from the reading device only if a reception response for the commodity information is transmitted from the commodity registration device. However, since there is a time lag between reading the commodity information and receiving the reception response, the outputting of the reading sound may be delayed, and operability of the commodity registration device deteriorates.

DETAILED DESCRIPTION

Embodiments provide a reading device and a method capable of preventing omission of a commodity registration from a sales transaction due to a communication failure while maintaining operability of the reading device for commodity registration.

According to one embodiment, a reading device comprises a communication interface configured to communicate with a commodity registration device, a commodity reader configured to read commodity information from a commodity to be used for identifying the commodity, an output device configured to signal that the commodity reader has read commodity information, and a controller. The controller causes the communication interface to transmit the commodity information read by commodity reader, initialize the communication interface when it is determined that transmission of the commodity information has failed, and signal a communication failure when transmission of the commodity information has failed.

Hereinafter, example embodiments of a reading device and a method will be described in detail with reference to the accompanying drawings. The example embodiments described below are explanatory examples and do not limit a configuration, a specification, or the like of a reading device and/or method according to embodiments of the present disclosure. In the examples, the reading device and method are applied to a commodity registration device that registers commodity information of a commodity to be sold at retail shops such as supermarkets.

Figure 1:
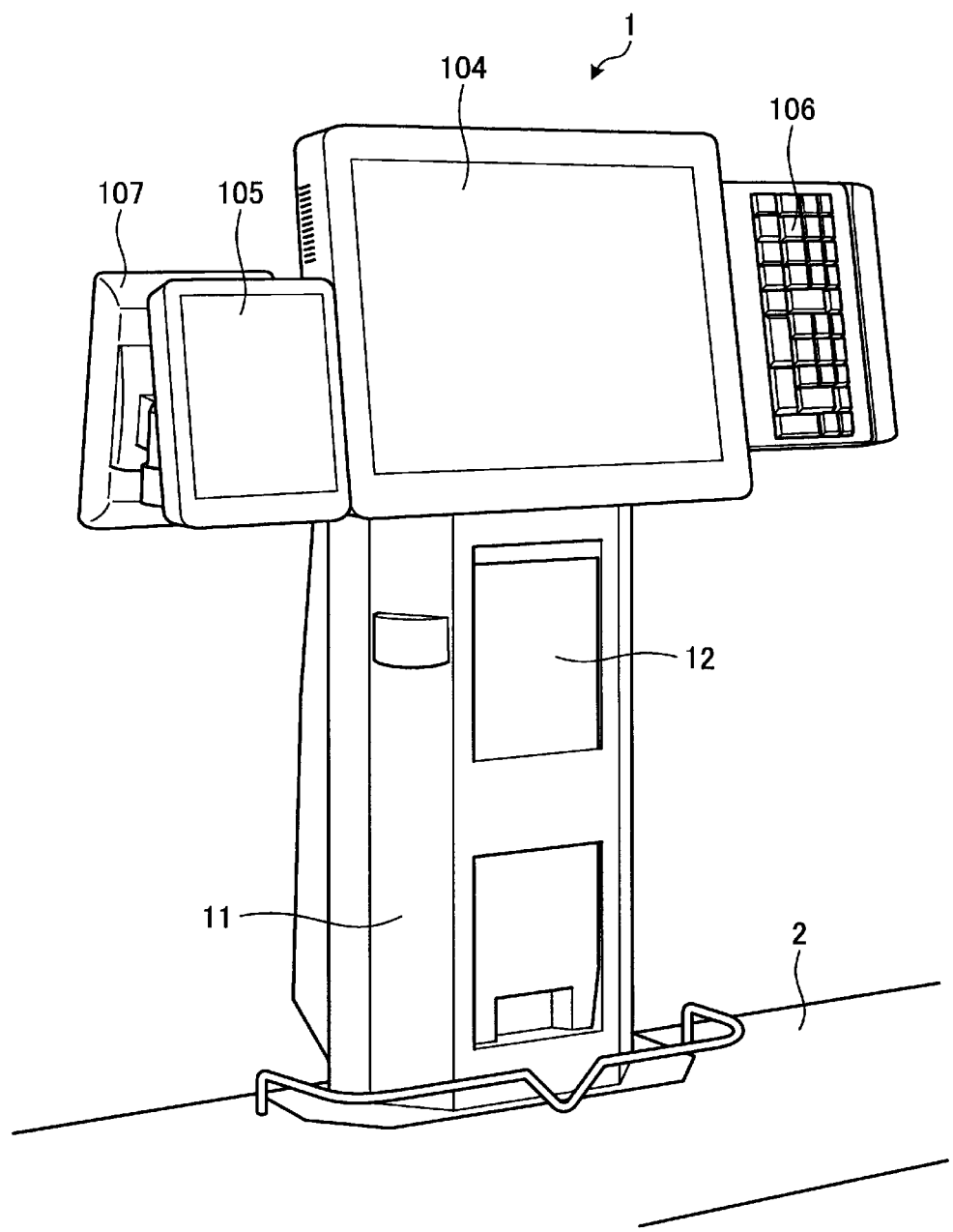
FIG. 1 is a perspective view illustrating an example of external appearance of a commodity registration device according to an embodiment.

FIG. 1 is a perspective view illustrating an example of external appearance of a commodity registration device 1 according to the present embodiment. The commodity registration device 1 is placed on a counter table 2. The commodity registration device 1 is provided with a substantially rectangular parallelepiped housing 11 that is long in a vertical direction. The housing 11 is provided with a first reading window 12 on a store clerk side. The first reading window 12 is formed of a plate that can transmit light. The commodity registration device 1 is provided with a reading device 20 (refer to FIG. 3) inside the first reading window 12. The reading device 20 points from an inside of the housing 11 to an outside of the first reading window 12.

The reading device 20 is, for example, a scanner device that reads commodity information on the commodity to be sold. Here, the commodity information is identification information capable of identifying a commodity. The commodity information is, for example, a commodity code such as a bar code or the like. In some examples, the commodity may be recognized by object recognition processes. In such examples, the commodity information may be a characteristic value associated with the external appearance of the commodity rather than a commodity code.

The commodity registration device 1 is provided with a first display unit 104, a second display unit 105, and an operation unit 106 on an upper side of the housing 11 facing the store clerk. The first display unit 104 is, for example, a liquid crystal display device on which a touch panel is stacked. The first display unit 104 displays various kinds of information to an operator such as a store clerk. The second display unit 105 is, for example, a liquid crystal display device on which a touch panel is stacked. The second display unit 105 displays various supplementary kinds of information such as a state of a POS terminal associated with the commodity registration device 1, for example, to the operator. The operation unit 106 is, for example, an input device such as a keyboard that accepts various operator inputs.

The commodity registration device 1 is provided with a third display unit 107 on a right side of the housing 11 as viewed from a customer side and on a back side of the second display unit 105. The third display unit 107 is, for example, a liquid crystal display device on which a touch panel is stacked. The third display unit 107 displays, for example, various kinds of information to the customer.

Next, a hardware configuration of the commodity registration device 1 and the reading device 20 will be described.

Figure 2:
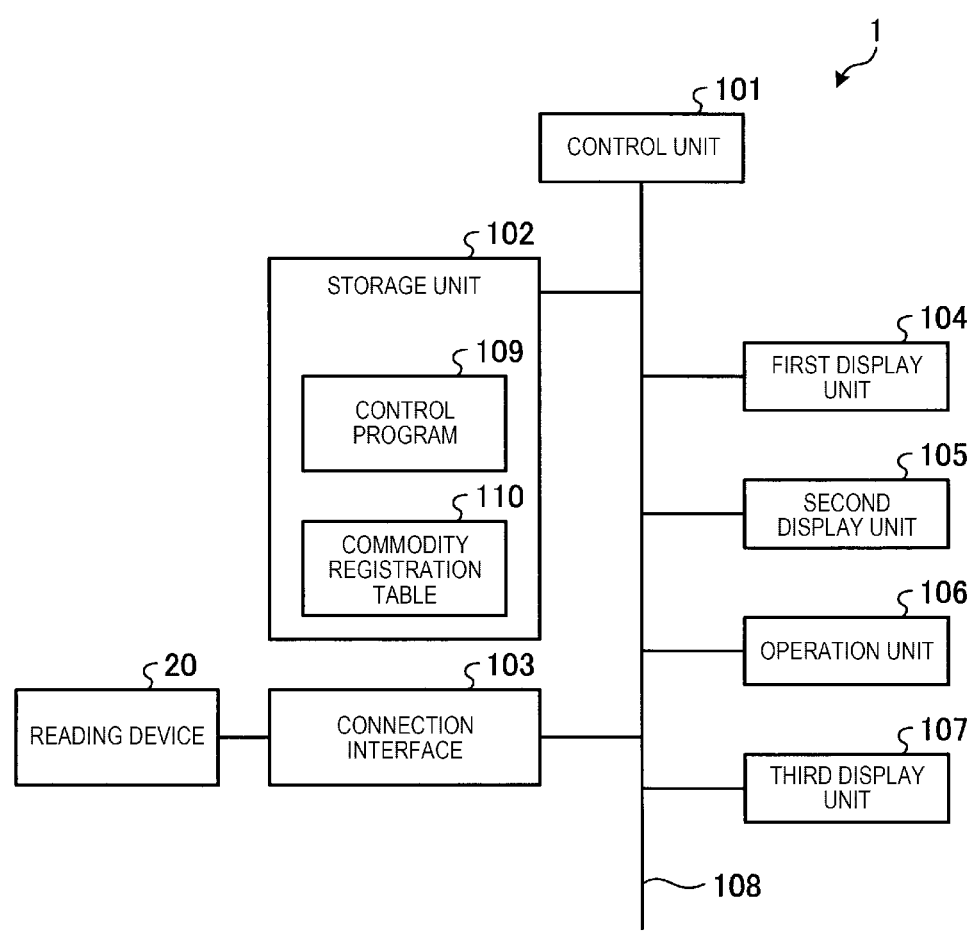
FIG. 2 is a block diagram illustrating an example of a hardware configuration of the commodity registration device.

FIG. 2 is a block diagram illustrating an example of a hardware configuration of the commodity registration device 1. The commodity registration device 1 is provided with a control unit 101, a storage unit 102, a connection interface 103, the first display unit 104, the second display unit 105, the operation unit 106, and the third display unit 107. These units are mutually connected via a system bus 108 comprising, for example, a data bus and an address bus.

The control unit 101 is a computer that controls the overall operation of the commodity registration device 1 and realizes various functions of the commodity registration device 1. The control unit 101 includes a central processing unit (CPU), a read only memory (ROM), and a random access memory (RAM). The CPU controls overall operation of the commodity registration device 1. The ROM is a nonvolatile storage medium that holds various data even if power is not supplied. The RAM is a storage medium to which various data can be written or read with respect to a specified area. The CPU executes a program stored in the ROM or the storage unit 102 or the like with the RAM used as a work area.

The storage unit 102 is a storage device such as a hard disk drive (HDD) or a solid state drive (SSD). The storage unit 102 stores a control program 109 and a commodity registration table 110.

The control program 109 is a program for causing the commodity registration device 1 to perform functional operations as described in this example. The control program 109 includes a program for implementing the functions of the commodity registration device 1 according to the present embodiment to be exhibited.

The commodity registration table 110 is an information table in which the commodity information of the commodity to be sold is registered. That is, the commodity registration table 110 is an information table in which the commodity identification information read by the reading device 20 is associated with other information for the commodity.

The connection interface 103 is an interface for controlling communication with the reading device 20. For example, the connection interface 103 is an integrated circuit device such as a USB controller that controls communication according to a universal serial bus (USB) standard. The connection interface 103 controls various functions on a host side in the USB communication. For example, the connection interface 103 transmits and receives various kinds of information according to a request from the control unit 101. In addition, the connection interface 103 outputs an interrupt signal or the like to the control unit 101 to notify the control unit 101 of various detected events. The connection interface 103 includes an engine for controlling the USB protocol, a buffer for temporarily storing information to be transmitted to and received from the control unit 101, a register for storing settings for USB communication, and the like. The connection interface 103 is not limited to a USB standard, and may be an integrated circuit device that controls communication according to any other communication standards.

Figure 3:
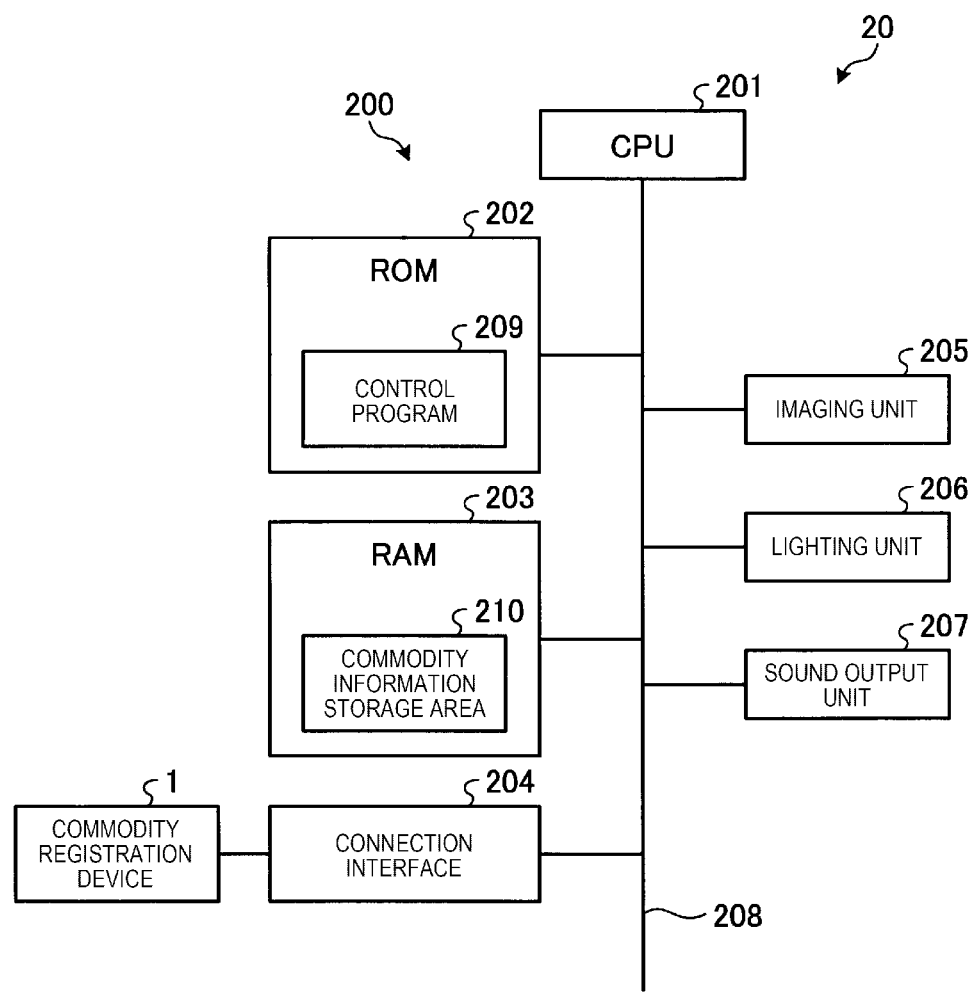
FIG. 3 is a block diagram illustrating an example of a hardware configuration of a reading device.

FIG. 3 is a block diagram illustrating an example of the hardware configuration of the reading device 20. The reading device 20 includes a control unit 200, a connection interface 204, an imaging unit 205, a lighting unit 206, and a sound output unit 207. These units are mutually connected via a system bus 208 comprising a data bus and an address bus.

The control unit 200, also referred to as a controller 200, is, for example, a computer that controls the overall operation of the reading device 20 and realizes various functions of the reading device 20 as described. The control unit 200 is provided with a CPU 201, a ROM 202, and a RAM 203. The CPU 201 controls the overall operation of the reading device 20. The CPU 201 executes a program stored in the ROM 202 or otherwise with the RAM 203 used as a work area.

The ROM 202 is a nonvolatile storage medium that holds various data even when power is not supplied. The ROM 202 stores a control program 209. The control program 209 is a program for causing the reading device 20 exhibit the functions described herein.

The RAM 203 is a storage medium to which data can be written and from which data can be read with respect to a designated area. The RAM 203 is provided with a commodity information storage area 210 for storing the commodity information that has been read, referred to in some instances as "read commodity information."

The connection interface 204 is an example of a communication unit. The connection interface 204 is an interface for executing communication with the commodity registration device 1. For example, the connection interface 204 is an integrated circuit device such as a USB controller that executes communication according to a USB standard. The connection interface 204 controls various functions on the device side in the USB communication. For example, the connection interface 204 transmits and receives various kinds of information according to a request from the control unit 200. In addition, the connection interface 204 outputs an interrupt signal or the like to the control unit 200 to notify the control unit 200 of various detected events. In addition, the connection interface 204 includes an engine for controlling the USB protocol, a buffer for temporarily storing information to be transmitted to and received from the control unit 200, a register for storing setting of USB communication, and the like. The connection interface 204 is not limited to a USB standard, and may be an integrated circuit device that controls communication according to any other communication standards. However, it is assumed that the communication standard of the connection interface 204 is generally the same as the communication standard of the connection interface 103 of the commodity registration device 1.

The imaging unit 205 is an image sensor such as a charge coupled device (CCD) or a complementary metal-oxide semiconductor (CMOS) that is used to read information such as commodity information.

The lighting unit 206 is a light that illuminates an imaging area of the imaging unit 205.

The sound output unit 207 is a speaker that outputs sound.

Next, functions of the commodity registration device 1 and the reading device 20 will be described. Here, FIG. 4 is a block diagram illustrating an example of the schematic functional configuration of the commodity registration device 1 and the reading device 20.

Figure 4:
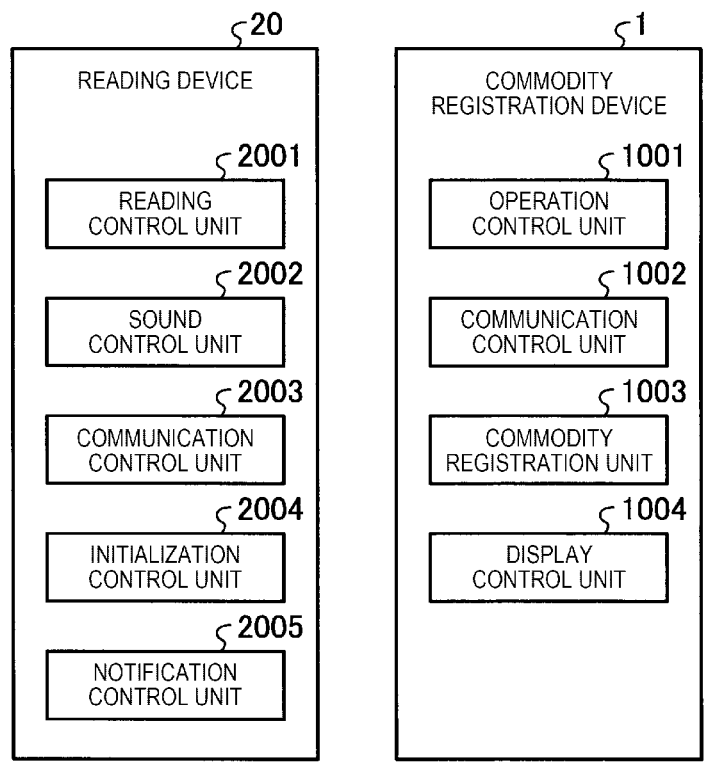
FIG. 4 is a block diagram illustrating an example of a schematic functional configuration of a commodity registration device and a reading device.

The control unit 200 of the reading device 20 loads the control program 209 from the ROM 202 to the RAM 203 and operates in accordance with the control program 209 to implement each functional unit of the reading device 20 illustrated in FIG. 4. Specifically, the control unit 200 implements a reading control unit 2001, a sound control unit 2002, a communication control unit 2003, an initialization control unit 2004, and a notification control unit 2005 as functional units according to the instructions of the control program 209.

The reading control unit 2001 is an example of a reading control unit. The reading control unit 2001 controls the imaging unit 205 to read the commodity information that can identify the commodity. The reading control unit 2001 stores the read commodity information in the commodity information storage area 210.

The sound control unit 2002 is an example of a first notification unit. The sound control unit 2002 controls the sound output unit 207 to output various sounds. For example, on the condition that the reading control unit 2001 successfully reads the commodity information, the sound control unit 2002 outputs a reading sound via the sound output unit 207 to indicate that the commodity information has been read.

The communication control unit 2003 is an example of a communication control unit. The communication control unit 2003 controls the connection interface 204 to control communication with the commodity registration device 1. For example, if the reading control unit 2001 stores the commodity information in the commodity information storage area 210, the communication control unit 2003 transmits the commodity information stored in the commodity information storage area 210 (see FIG. 3) to the connection interface 204 (see FIG. 3).

In addition, the communication control unit 2003 determines whether a reception response (indicating that the commodity information has been received or not by the commodity registration device 1) has been received within a predetermined period. Here, the predetermined period is not particularly limited, and, for example, may be one second. If the reception response is received within the predetermined period, the communication control unit 2003 determines that the commodity information has been normally transmitted. If the reception response is not received within the predetermined period, the communication control unit 2003 determines that transmission of the commodity information has failed. That is, the communication control unit 2003 determines that a communication failure between the commodity registration device 1 and the reading device 20 has occurred.

In addition, if a response to the communication failure information is received within a predetermined period after transmitting of the communication failure information (indicating that transmission of the commodity information failed), the communication control unit 2003 determines that the communication failure has been recovered. That is, communication has been restored between the reading device 20 and the commodity registration device 1. On the other hand, if no response to the communication failure information is received the predetermined period after transmitting the communication failure information, the communication control unit 2003 determines that the communication failure has not been recovered.

The initialization control unit 2004 is an example of an initialization control unit. The initialization control unit 2004 controls initializing for initializing each unit. For example, the initialization control unit 2004 initializes the connection interface 204 if it is determined that the communication control unit 2003 failed to transmit the commodity information. Here, if a problem such as a deadlock occurs in the connection interface 204, the communication control unit 2003 cannot transmit the commodity information. Therefore, the initialization control unit 2004 initializes the connection interface 204 so as to recover from the communication failure to a communicable state.

In addition, the initialization control unit 2004 initializes prescribed components in a prescribed order until the communication failure is recovered. More specifically, the initialization control unit 2004 first initializes the connection interface 204 when the communication failure occurs. If the communication failure is not recovered after the connection interface 204 has been initialized, the initialization control unit 2004 next initializes the system bus 208, a bus controller, or the like between the connection interface 204 and the CPU 201. If the communication failure is still not recovered even after the system bus 208 (or the bus controller and the like) has been initialized, the initialization control unit 2004 next initializes itself by restarting the reading device 20 entirely. The above-described order for initializations and the components initialized are examples and can be arbitrarily changed. In addition, the reading device 20 may be provided with a unit for setting the order of initialization and the components.

The notification control unit 2005 is an example of the second notification unit. If it is determined that the communication control unit 2003 failed to transmit the commodity information, the notification control unit 2005 signals a communication failure between the commodity registration device 1 and the reading device 20 has occurred. For example, if the communication control unit 2003 does not receive the reception response within a predetermined period, the notification control unit 2005 causes the sound control unit 2002 to generate a sound such as a buzzer sound. In addition, the notification control unit 2005 notifies the communication control unit 2003 by transmitting communication failure information indicating that the transmission of commodity information has failed even after the initialization control unit 2004 has initialized the connection interface 204.

The control unit 101 of the commodity registration device 1 loads the control program 109 of the storage unit 102 on the RAM and operates in accordance with the control program 109, thereby generating the respective functional units of the commodity registration device 1 as illustrated in FIG. 4. Specifically, the control unit 101 of the commodity registration device 1 implements an operation control unit 1001, a communication control unit 1002, a commodity registration unit 1003, and a display control unit 1004 as functional units according to instructions of the control program 109.

The operation control unit 1001 controls the operation unit 106 to accept various input operations. In addition, the operation control unit 1001 controls each touch panel to accept various input operations.

The communication control unit 1002 controls the connection interface 103 to control communication with the reading device 20. For example, the communication control unit 1002 receives various kinds of information such as commodity information and communication failure information. When receiving the commodity information, the communication control unit 1002 transmits a reception response to the reading device 20 to indicate that the commodity information has been received. In addition, when receiving communication failure information, the communication control unit 1002 transmits a reception response to the reading device 20 indicating reception of communication failure information.

The commodity registration unit 1003 registers the commodity to be sold as the commodity. More specifically, when receiving the commodity information of the commodity to be sold from the reading device 20, the commodity registration unit 1003 registers the received commodity information in the commodity registration table 110. The commodity registration unit 1003 is not limited to a case where the commodity information is received from the reading device 20, and if the operation control unit 1001 accepts an operation of designating a commodity to be sold, the commodity registration unit 1003 may register the commodity information of the designated commodity in the commodity registration table 110.

The display control unit 1004 controls the first display unit 104, the second display unit 105, and the third display unit 107 to display various screens. For example, the display control unit 1004 displays a commodity registration screen on which the commodity registered by the commodity registration unit 1003 is indicated. The commodity registration screen includes a list of commodity information registered in the commodity registration table 110 and the like.

In addition, when the operation control unit 1001 receives communication failure information, the display control unit 1004 causes the first display unit 104 or the like to display a warning screen. On the warning screen, since the communication failure occurred between the commodity registration device 1 and the reading device 20, the warning screen warns that there is a possibility that one or more commodities that have been read by the reading device 20 may not have been successfully registered as a commodity in the sales transaction. In addition, on the warning screen, a message or the like for requesting confirmation that there is no omission of the commodity registration by comparing the last commodity for which the commodity information has been read by the reading device 20 with the last commodity registered in the commodity registration table.

In addition, the display control unit 1004 deletes the warning screen after a predetermined time period elapses after the initial displaying of the warning screen, or when the operation control unit 1001 receives an operation to delete the warning screen. The display control unit 1004 re-displays the commodity registration screen after deleting the warning screen. As a result, the store clerk can confirm that there was no omission in registration by comparing the commodity for which the commodity information was read by the reading device 20 to the commodities that have been registered. In some examples, the display control unit 1004 may display icons, messages, or the like indicating the warning contents of a warning screen on a portion of the commodity registration screen. In this case, the store clerk can confirm the presence or absence of the omission of the commodity registration without being overly disturbed in the commodity registration process by the warning screen.

In addition, the display control unit 1004 may display a warning screen on the second display unit 105. The display control unit 1004 displays a commodity registration screen on the first display unit 104. Therefore, since the warning screen is not displayed on the first display unit 104, the store clerk can confirm the presence or absence of the omission of the commodity registration without being overly disturbed in the commodity registration process by the warning screen.

In addition, the display control unit 1004 may display a warning screen on the third display unit 107 directed to the customer side. When there is omission of the commodity registration, the store clerk will generally attempt to re-register the commodity that was not previously successfully registered as a commodity. However, if the warning screen is not displayed on the third display unit 107, the customer might not understand that there was an inadvertent omission of a commodity in the commodity registration process. Therefore, the clerk's act of causing a commodity not successfully registered as a commodity to be re-registered as a commodity could appear to the customer as an act of causing the commodity to be duplicated in the commodity registration process. Therefore, by allowing the display control unit 1004 to display the warning screen on the third display unit 107, the customer can be prevented from misunderstanding the registration processing.

Figure 5:
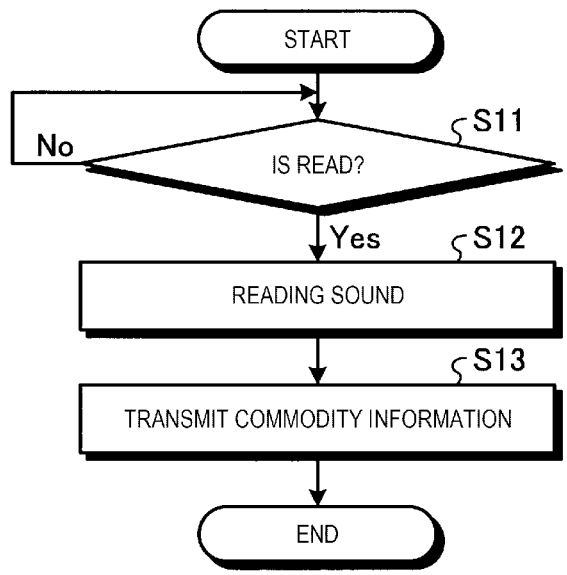
FIG. 5 is a flowchart illustrating aspects of a reading process.

Next, reading executed by the reading device 20 will be described. The reading is a reading of commodity information for a commodity in a sales transaction, for example. Here, FIG. 5 is a flowchart illustrating an example of reading executed by the reading device 20 according to the present embodiment.

The reading control unit 2001 determines whether or not the commodity information has been read (Act 11). On the condition that the commodity information has not been read (Act 11; No), the reading device 20 stands by at Act 11.

On the other hand, when the commodity information has been read (Act 11; Yes), the sound control unit 2002 causes the reading sound indicating that the commodity information has been read to be output (Act 12).

The communication control unit 2003 transmits the read commodity information to the commodity registration device 1 (Act 13).

As described above, the reading device 20 ends the reading process for a particular commodity.

Figure 6:
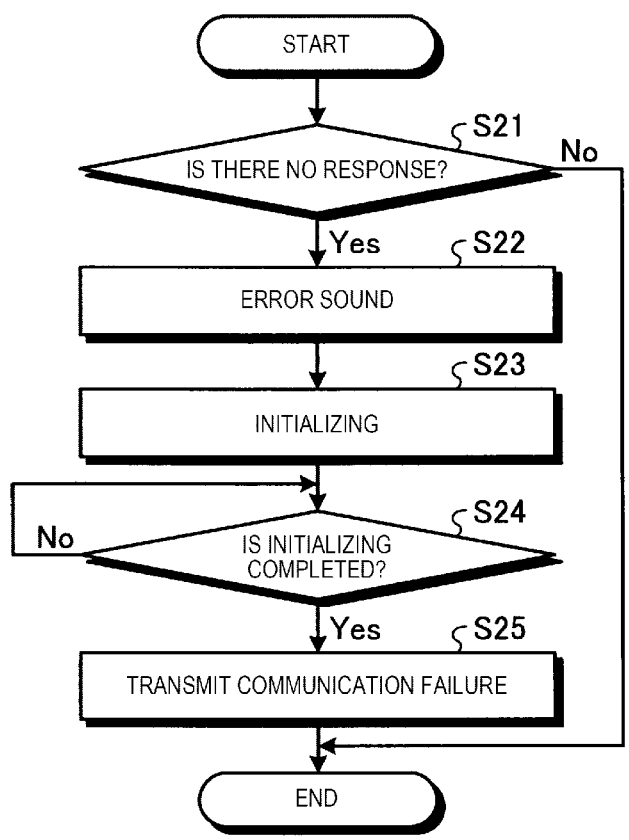
FIG. 6 is a flowchart illustrating aspects of a recovering process.

Next, a recovering process executed by the reading device 20 will be described. The recovering process is a recovering from a communication failure to a communicable state. Here, FIG. 6 is a flowchart illustrating an example of recovering process executed by the reading device 20 according to the present embodiment.

The communication control unit 2003 determines whether or not a reception response (indicating that the commodity information has been received by the commodity registration device 1) has been received within a predetermined period after the transmission of the commodity information (Act 21). On the condition that the reception response has been received from the commodity registration device 1 within the predetermined period (Act 21; No), the reading device 20 ends communication failure state.

On the condition that the reception response has not been received from the commodity registration device 1 within the predetermined period (Act 21; Yes), the notification control unit 2005 outputs an error sound (Act 22).

The initialization control unit 2004 initializes the connection interface 204 (Act 23).

The initialization control unit 2004 determines whether or not the initializing is completed (Act 24). If the initializing is not completed (Act 24; No), the reading device 20 stands by at Act 24.

If the initializing is completed (Act 24; Yes), the notification control unit 2005 causes the communication control unit 2003 to transmit communication failure information indicating that a communication failure occurred (Act 25).

As described above, the reading device 20 ends the recovering process.

Figure 7:
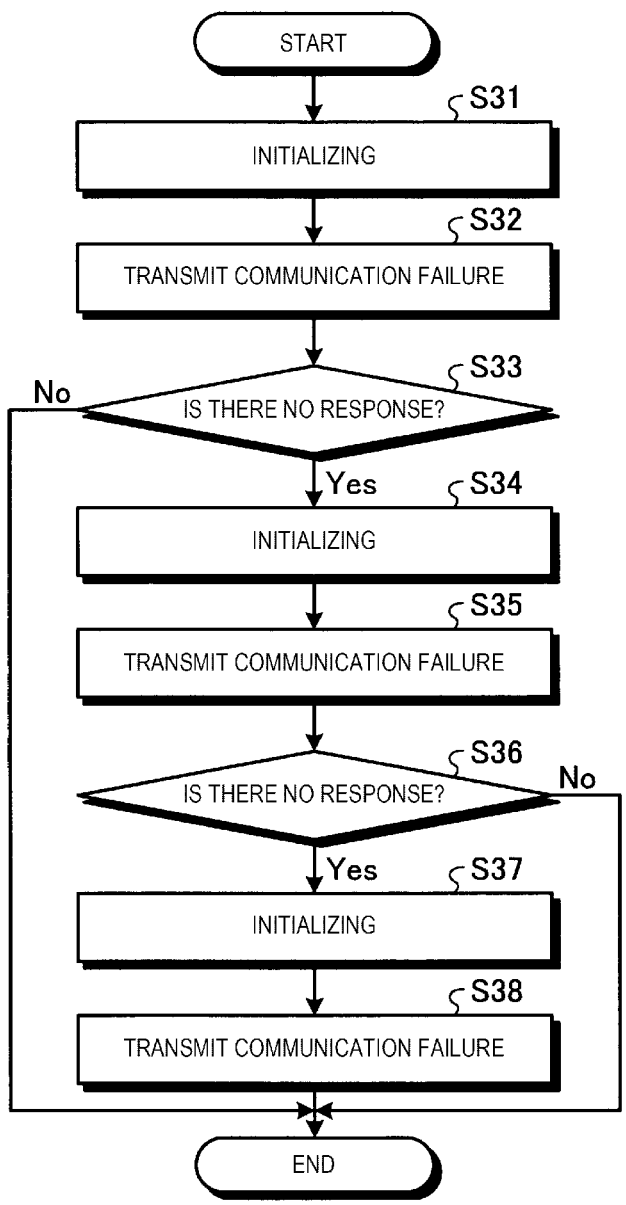
FIG. 7 is a flowchart illustrating aspects of a stepwise recovering process.

Next, a stepwise recovering process executed by the reading device 20 will be described. The stepwise recovering process includes initializing prescribed components in a prescribed order when the communication failure has not been recovered even after an initialization step. Here, FIG. 7 is a flowchart illustrating an example of stepwise recovering process executed by the reading device 20 according to the present embodiment.

The initialization control unit 2004 initializes the connection interface 204 (Act 31).

When the initializing of the connection interface 204 is completed, the notification control unit 2005 causes the communication control unit 2003 to transmit the communication failure information (Act 32).

The communication control unit 2003 determines whether or not a reception response indicating reception of the communication failure information has been received within a predetermined period from the transmission of the communication failure information (Act 33). If the reception response has been received within the predetermined period (Act 33; No), the reading device 20 ends the stepwise recovering process.

If the reception response is not received within the predetermined period (Act 33; Yes), the notification control unit 2005 next initializes the system bus 208, the bus controller, or the like (Act 34).

When the initializing of the system bus 208, the bus controller, or the like is completed, the notification control unit 2005 causes the communication control unit 2003 to transmit communication failure information (Act 35).

The communication control unit 2003 determines whether or not a reception response indicating the reception of the communication failure information has been received within the predetermined period from the transmission of communication failure information (Act 36). If the reception response is received within the predetermined period (Act 36; No), the reading device 20 ends the stepwise recovering process.

If the reception response is not received within the predetermined period (Act 36; Yes), the notification control unit 2005 initializes the reading device 20 entirely by restarting the reading device 20 (Act 37).

When the initializing by restarting is completed, the notification control unit 2005 causes the communication control unit 2003 to transmit the communication failure information (Act 38).

As described above, the reading device 20 ends the stepwise recovering process.

Figure 8:
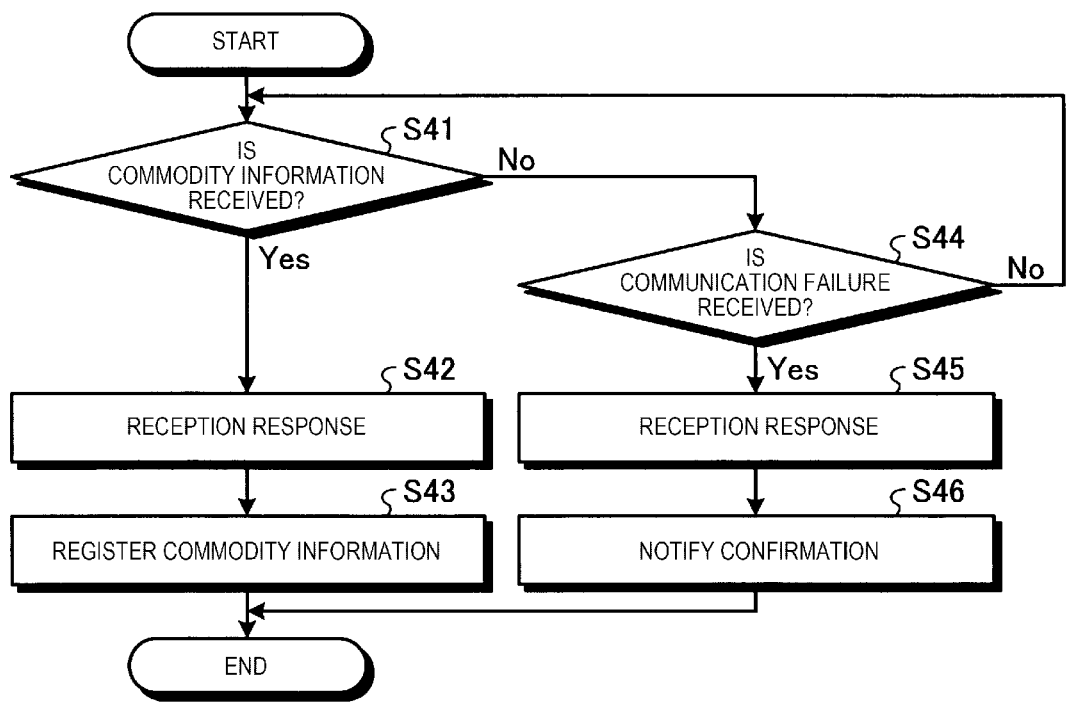
FIG. 8 is a flowchart illustrating aspects of a registering process.

Next, registering executed by the commodity registration device 1 will be described. Here, FIG. 8 is a flowchart illustrating an example of registering executed by the commodity registration device 1 according to the present embodiment.

The communication control unit 1002 determines whether or not the commodity information has been received (Act 41).

If the commodity information is received (Act 41; Yes), the communication control unit 1002 transmits the reception response indicating that the commodity information has been received (Act 42).

The commodity registration unit 1003 registers the received commodity information in the commodity registration table 110 (Act 43). The commodity registration device 1 ends the registering of the commodity corresponding to the commodity information.

If the commodity information is not received (Act 41; No), the communication control unit 1002 determines whether or not the communication failure information has been received (Act 44). If the communication failure information has not been received (Act 44; No), the commodity registration device 1 returns to Act 41.

If communication failure information is received (Act 44; Yes), the communication control unit 1002 transmits the reception response indicating that communication failure information has been received (Act 45).

The display control unit 1004 displays a confirmation screen requesting confirmation of the omission of commodity registration (Act 46).

As described above, the commodity registration device 1 ends the registering processing for the commodity corresponding to the commodity information.

As described above, the reading device 20 according to the present embodiment transmits the commodity information to the commodity registration device 1 when the commodity information is read. The reading device 20 initializes the connection interface 204 if there is no reception response for the commodity information from the commodity registration device 1. After the initialization of the connection interface 204, the reading device 20 transmits the communication failure information (indicating that a communication failure occurred) to the commodity registration device 1, and causes the commodity registration device 1 to signal the possibility of an omission in the commodity registration. Therefore, since a communication time lag does not occur in the output of the reading sound by the reading device after the reading of the commodity information, the reading device 20 can maintain normal operability and the reading device 20 transmits communication failure information and notifies the commodity registration device 1 of the possibility of omission of the commodity registration. Thus, omissions from the commodity registration due to communication failures between the reading device 20 and the commodity registration device can be prevented.

In addition, in the above-described example embodiment, the case where the reading device 20 is applied to a stationary commodity registration device 1 placed on the counter table 2 is described. However, the reading device 20 is not limited to a stationary type, and embodiments of the present disclosure can also be applied to a hand-held or portable scanner or the like.

In addition, in the above-described example embodiment, the reading device 20 is described to transmit the communication failure information to the commodity registration device 1 if a reception response (indicating that the commodity information has been received) is not received within a predetermined period from the transmission of the commodity information. That is, if the reading device 20 fails to successfully transmit the commodity information, the communication failure information is transmitted to the commodity registration device 1. However, the reading device 20 may instead re-transmit the commodity information that failed in prior transmission instead of specific communication failure information, or may re-transmit the commodity information along with the communication failure information. In this case, the commodity registration device 1 may register the commodity according to the re-transmitted commodity information.

The programs to be executed by each device of the embodiments and the modifications are assumed to be provided by being incorporated in advance in a storage medium (ROM or storage unit) provided in each device, but the programs are not limited thereto. For example, a program according to an embodiment may be configured so as to be provided on a non-transitory computer readable recording medium such as a CD-ROM, a flexible disk (FD), a CD-R, a digital versatile disk (DVD) in a file in an installable format or an executable format. Furthermore, the program may be transmitted by a LAN, the Internet, or the like an downloaded and stored or temporarily stored in the operating devices.

In addition, the programs executed by each device of the examples embodiments and the modifications may be stored on a computer connected to a network, such as the Internet, and provided by being downloaded via the network, or the programs may be provided or distributed via a network such as the Internet.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A product code reading device, comprising:
    a communication interface configured to communicate with a point-of-sale terminal;
    a commodity reader configured to read commodity information from a commodity for identifying the commodity in a sales transaction;
    an output device configured to signal to a user of the commodity reader that the commodity reader has successfully read commodity information from the commodity; and
    a controller configured to:
        cause the communication interface to transmit the commodity information read by the commodity reader to the point-of-sale terminal for registration in the sales transaction,
        initialize the communication interface so as to recover a communicable state after a communication failure when it is determined that transmission of the commodity information to the point-of-sale terminal has failed during the sales transaction, and
        cause the output device to signal a communication failure to the user of the commodity reader when transmission of the commodity information to the point-of-sale terminal has failed during the sales transaction, wherein
    the controller is further configured to initialize other components of the product code reading device in a prescribed order if the communicable state is not recovered after the communication interface has been initialized.

2. The product code reading device according to claim 1, wherein, after the initialization of the communication interface, if the communicable state is recovered, the controller causes the communication interface to transmit communication failure information indicating that the transmission of the commodity information has failed.

3. The product code reading device according to claim 1, wherein
    the output device signals, using a first audible signal, that the commodity reader has read commodity information during the sales transaction, and
    the controller causes the output device to signal the communication failure using a second audible signal, distinct in tone from the first audible signal.

4. The product code reading device according to claim 1, wherein the output device is a speaker included in the commodity reader.

5. The product code reading device according to claim 1, wherein the controller determines that the communicable state has not been recovered when a response from the point-of-sale terminal is not received via the communication interface within a predetermined time after a transmission of communication failure information to the point-of-sale terminal.

6. The product code reading device according to claim 1, wherein the commodity reader is a bar code scanner.

7. The product code reading device according to claim 1, wherein the output device comprises a speaker.

8. The product code reading device according to claim 1, wherein the controller is further configured to cause the communication interface to re-transmit the commodity information read by the commodity reader along with the signal of the communication failure.

9. The product code reading device according to claim 1, wherein the commodity reader is disposed within the point-of-sale terminal.

10. The product code reading device according to claim 1, wherein the commodity reader is a hand-held scanner.

11. A point-of-sale apparatus, comprising:
    a display screen for displaying commodity information related to a sales transaction;
    a first communication interface configured to receive commodity information; and
    a product code reading device including:
        a second communication interface configured for communication of commodity information to first communication interface;
        a commodity reader configured to read commodity information from a commodity for identifying the commodity in the sales transaction;
        an output device configured to signal to a user of the commodity reader that the commodity reader has successfully read commodity information from the commodity; and
        a controller configured to:
            cause the second communication interface to transmit the commodity information read by the commodity reader to the first communication interface for registration in the sales transaction,
            initialize the second communication interface so as to recover a communicable state after a communication failure when it is determined that transmission of the commodity information to the first communication interface has failed during the sales transaction, and
            cause the output device to signal a communication failure when transmission of the commodity information to the first communication interface has failed during the sales transaction, wherein
        the controller is further configured to initialize other components of the product code reading device in a prescribed order if the communicable state is not recovered after the second communication interface has been initialized.

12. The point-of-sale apparatus according to claim 11, wherein, after the initialization of the second communication interface, if the communicable state is recovered, the controller causes the second communication interface to transmit communication failure information to the first communication interface indicating that the transmission of the commodity information has failed.

13. The point-of-sale apparatus according to claim 11, wherein
the output device signals, using a first audible signal, that the commodity reader has read commodity information, and
the controller causes the output device to signal the communication failure using a second audible signal distinct from the first audible signal.

14. The point-of-sale apparatus according to claim 11, wherein the controller is further configured to cause the second communication interface to re-transmit the commodity information read by the commodity reader along with the signal of the communication failure.

15. The point-of-sale apparatus according to claim 11, wherein the commodity reader is a bar code scanner.

16. The point-of-sale apparatus according to claim 11, wherein the commodity reader is a hand-held scanner.

17. A sales transaction registration method, comprising:
reading commodity information for identifying a commodity in a sales transaction using a commodity reader device;
signaling to a user of the commodity reader device using a first audible sound that commodity reader device has successfully read commodity information of a commodity in the sales transaction;
attempting transmission of the commodity information from the commodity reader device to a sales registration device via a communication interface of the commodity reader device;
initializing the communication interface so as to recover a communicable state after a communication failure if the attempted transmission of commodity information fails;
signaling a communication failure to the user of the commodity reader device using a second audible sound distinct from the first sound if the attempted transmission of commodity information fails; and
initializing other components of the commodity reader device in a prescribed order if the communicable state is not recovered after the communication interface has been initialized.

18. The sales transaction registration method according to claim 17, further comprising:
transmitting a communication failure notice to the sales registration device via the communication interface if the attempted transmission of the commodity information fails.

19. The sales transaction registration method according to claim 18, further comprising:
re-attempting transmission of the commodity information to the sales registration device after a response to communication failure notice from the sales registration device is received via the communication interface.

20. The sales transaction registration method according to claim 18, further comprising:
re-transmitting the commodity information along with the communication failure notice.

* * * * *